United States Patent Office 3,397,120
Patented Aug. 13, 1968

3,397,120
PURIFICATION OF DIHYDROISOPHORONE BY PLURAL DISTILLATION AND ISOMERIZATION
William D. Diana, Somerville, William E. Wellman, Edison, and Paul E. Burton, Westfield, N.J., assignors to Esso Research and Engineering Company, a corporation of Delaware
Filed Jan. 13, 1967, Ser. No. 609,214
31 Claims. (Cl. 203—28)

ABSTRACT OF THE DISCLOSURE

Method for purification of dihydroisophorone from crude dihydroisophorone feedstocks containing beta-isophorone and alpha-isophorone as major impurities whereby both dihydroisophorone and beta-isophorone are first separated from alpha-isophorone by distillation and then dihydroisophorone is thereafter separated from the beta-isophorone impurity by means of isomerizing the beta-isophorone to its alpha-isomer and then separating the resulting alpha-isophorone from dihydroisophorone by distillation to yield dihydroisophorone of 99+% purity.

---

Figure 1:
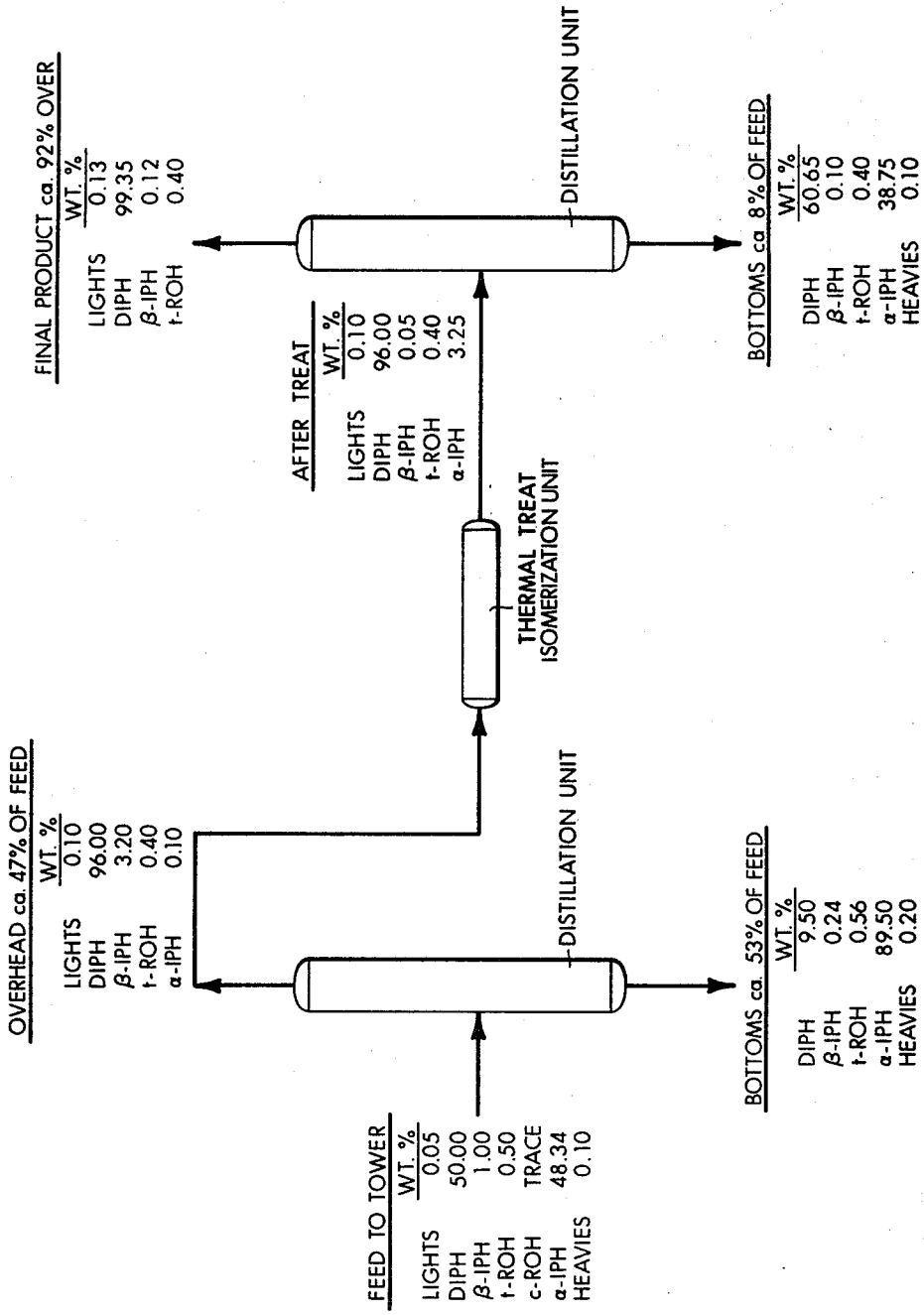

This invention relates to an improved method for dihydroisophorone purification. More particularly, this invention relates to an improved method for the purification of dihydroisophorone from dihydroisophorone feedstocks containing beta-isophorone and alpha-isophorone as major impurities whereby both dihydroisophorone and beta-isophorone are first separated from alpha-isophorone and then dihydroisophorone is thereafter separated from the beta-isophorone impurity. By means of the present invention, dihydroisophorone of better than 99% purity is readily obtainable by means of conventional distillation, without recourse to very refined distillation techniques and/or heavy capital investment in highly efficient distillation apparatus.

Isophorone, the precursor of dihydroisophorone, has long been known as an excellent solvent for polymeric materials and more recently has been found to have particular applications in the surface coating field. For example, it is particularly useful as a coil-coating solvent in vinyl resin formulations employed in the coating of aluminum for house sidings. Isophorone is also useful as a high boiling solvent for many other types of resins, such as nitrocellulose resins and chlorinated rubber resins, as well as alkyd, polyester, epoxy, and acrylic resins; and may be additionally employed in the preparation of chemical intermediates, as a dispersant for lacquers, and as a thinner for plastisols and organosols.

Dihydroisophorone is extremely similar to isophorone in terms of the latter's commercial applications, as noted above, but has a number of important advantages over isophorone. As an illustration, employment of isophorone as the high boiling solvent in a coil coating formulation frequently engenders coloration of the final product, whereas utilization of dihydroisophorone results in products with less coloration. Moreover, when employed in coil coating, dihydroisophorone results in decidedly less color development over a wide range of bake schedules as compared to isophorone. This is especially important in situations where the coatings are white in color and utilized for such items as household appliances like refrigerators, washing machines, electric or gas ranges, etc.; in such cases, yellowing of these white coatings, caused by isophorone and/or overbake, would be quite harmful. Moreover, since dihydroisophorone has a faster evaporation rate than isophorone, this results in faster cure speeds in coil coating and also decreased susceptibility to overbake over the range of bake schedules customarily employed. Dihydroisophorone also has much better color stability on long term storage than isophorone, which develops color quite rapidly over a short span of storage time such as a few days or weeks.

To the foregoing advantages, another distinct, and potentially great, advantage may be added: the fact that isophorone contributes to smog whereas dihydroisophorone should not. In connection with recent investigations of air pollution in the Los Angeles County area and elsewhere, it has been discovered that unsaturated ketones are a highly undesirable contributor to smog whose threat to public health has long been recognized and whose removal or reduction been long sought by scientific means and even by political legislation. Since industries which commonly utilize solvents such as isophorone do not customarily recover them in their original or usable form but instead allow them to pass as exhaust gases which contribute to the smog in the atmosphere, there exists a present need for high boiling ketonic solvents that do not promote air pollution and yet have equivalent utility to their objectionable unsaturated ketonic counterparts presently used, which do promote air pollution. This need seems quite likely to soon become increasingly greater, since there is presently extensive public pressure for local and federal legislation to control smog.

Apart from the foregoing advantages over isophorone which dihydroisophorone has relative to commercial coatings, dihydroisophorone is superior to isophorone in the preparation of organosols since it provides better organosols with greater shelf stability than does isophorone.

Dihydroisophorone, hereinafter referred to as DIPH, is a high boiling (B.P. 191° C.) cyclic saturated ketone (3,3,5-trimethylcyclohexanone) having the formula:

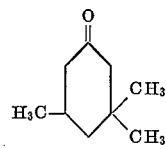

DIPH is usually prepared from alpha-isophorone, hereinafter referred to as alpha-IPH ($\alpha$-IPH), an unsaturated cyclic ketone (3,3,5-trimethylcyclohexenone) having the formula

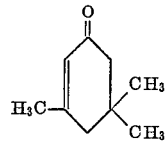

by controlled catalytic hydrogenation. DIPH is an intermediate hydrogenation product of alpha-IPH, since DIPH may be further hydrogenated readily to the cis- and trans-isomers of 3,3,5-trimethylcyclohexanol. Since over-hydrogenation of alpha-IPH to the aforenoted cis- and trans-isomers of 3,3,5-trimethylcyclohexanol increases with increasing temperature, the usual method of preparing DIPH from alpha-IPH is by controlled hydrogenation conditions, i.e., mild conditions. The DIPH crude product resulting from such controlled hydrogenation contains unreacted alpha-IPH and its isomer beta-isophorone ($\beta$-IPH) hereinafter referred to as beta-IPH, having the formula:

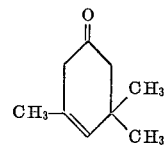

as major impurities, along wit h additional impurities such as cis- and trans-3,3,5-trimethylcyclohexanol. Removal of these impurities, along with lower and higher boilers than DIPH, from a DIPH crude product resulting from controlled hydrogenation of alpha-isophorone essentially constitutes the subject matter of this invention.

The four main impurities previously mentioned as contaminating the crude DIPH product, i.e., beta-IPH, alpha-IPH, and the cis- and trans-isomers of 3,3,5-trimethylcyclohexanol, have boiling points, respectively, of about 188° C., about 215° C., about 201° C., and about 194° C. Thus, to one of ordinary skill in the art, assuming his identification of the above four impurities, it would be apparent that alpha-IPH and cis-3,3,5-trimethylcyclohexanol could be readily separated by ordinary commercial distillation techniques but that beta-IPH and trans-3,3,5-trimethylcyclohexanol would require special, refined distillation techniques and/or highly efficient, special distillation equipment. Accordingly, the considerable expense involved in purification of DIPH crude by refined distillation would normally act as a deterrent to commercial acceptance of this method of purification. Moreover, even if refined and highly efficient distillation techniques were employed to effect such purification, it would be found that separation of beta-IPH from DIPH, apart from being extremely difficult per se, is rendered even more difficult due to a net increase in the beta-IPH concentration during the course of distillation. Beta-IPH (boiling point about 188° C.) it is to be noted, is extremely difficult to separate from DIPH (boiling point: 191° C.) due to the closeness of their boiling points. This separation is further complicated by the very facile interconversion of alpha-IPH and beta-IPH, which can be illustrated by the following equation:

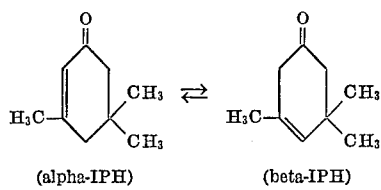

(alpha-IPH)        (beta-IPH)

Thus, during distillation of a crude DIPH feedstock containing at least the aforementioned four main impurities appreciable amounts of beta-IPH can build up. Since beta-IPH is much more volatile than alpha-IPH, beta-IPH is taken overhead first. Then, the residual alpha-IPH again isomerizes to form more beta-IPH, which, in turn, is again removed overhead. The result of all this is a net increase in beta-IPH. The difficulty associated with these separations is illustrated herebelow in Example 1.

By means of the present invention, however, there is now provided a simplified method for the purification of DIPH which is able to accommodate effective removal of the impurities previously contaminating the DIPH crude and which enables the production of DIPH at a purity level of 99+% at minimum expense and investment. In accordance with a broad aspect of this invention, purification of DIPH from DIPH feedstocks containing beta-IPH and alpha-IPH as major impurities is essentially effected by first separating both DIPH and beta-IPH from alpha-IPH and then thereafter separating the DIPH from the beta-IPH impurity.

In accordance with a preferred embodiment of the present invention, the alpha-IPH concentration in the DIPH feed is first reduced by distillation, resulting in some generation and build-up of the lower boiling beta-IPH impurity, which passes overhead, together with beta-IPH originally contained in the feed, with DIPH; then the overhead product of such distillation is thermally treated in order to isomerize beta-IPH to alpha-IPH; thereafter, DIPH, in excess of 99% purity, is then separated from the alpha-IPH by distillation. Alternatively, the thermal treatment, employed to isomerize beta-IPH, may be conducted with basic or acidic catalysts to accelerate the rate of isomerization of beta-IPH to alpha-IPH. Thus, it can be seen that a critical step in the present purification is the conversion of the beta-IPH to alpha-IPH, whereby DIPH of the requisite purity is readily separated from all the alpha-IPH then present by means of ordinary distillation, based on the large temperature differential in boiling points of DIPH and alpha-IPH.

While the use of an independent thermal treatment, prior to the distillation of the mixture of DIPH and beta-IPH, is preferable since it renders the extent and rate of isomerization of beta-IPH to alpha-IPH readily controllable, the conversion of beta-IPH to its alpha-isomer need not be confined to an independent thermal treatment since the distillation unit itself can serve as a means to accomplish the isomerization. For example, in a batch distillation of the first overhead product consisting mainly of DIPH and beta-IPH, where such product is charged to the stillpot and brought to total reflux, during the period of heating to reflux, beta-IPH isomerizes to alpha-IPH, its higher boiling isomer. By the expression "total reflux" is meant conditions of distillation wherein no feed is introduced to the distillation unit and no product is withdrawn therefrom. When the desired conversion of beta-IPH to alpha-IPH is attained, the resulting mixture of DIPH and alpha-IPH can be distilled to recover DIPH of better than 99% purity. Alternatively, it is also possible to convert beta-IPH to alpha-IPH in a continuous distillation by continuously passing a distillate comprising DIPH and beta-IPH (resulting typically from distillation of a crude DIPH feedstock comprising beta-IPH and alpha-IPH as main impurities) into a distillation unit and distilling the distillate in such unit under conditions such that the beta-IPH is substantially completely isomerized to alpha-IPH without causing pyrolysis of the remainder of the distillate while concurrently separating the distillate comprising DIPH from the residue comprising alpha-IPH, and recovering the purified DIPH product.

While the foregoing discussion has focused attention on the preferred methods of DIPH purification, other methods are available with which to effect DIPH purification, although these other methods are much less preferred than the aforementioned preferred methods. For example, DIPH purification can be effected utilizing two distillations, a thermal treatment, and an additional flash distillation. In this alternative method, typical crude DIPH feedstock comprising alpha-IPH and beta-IPH as main impurities is distilled, whereby most of the DIPH and beta-IPH are taken overhead as a distillate, leaving alpha-IPH as residue. This distillate is then distilled in a second distillation unit, which is so designed and operated so as to concentrate the beta-IPH impurity in the distillate of this second distillation. However, since both DIPH and beta-IPH are close boiling compounds, the distillate from said second distillation will contain appreciable amounts of DIPH as well as beta-IPH. The balance of DIPH from the feed to the second distillation is accordingly essentially free of beta-IPH and can be removed as a residue from said second distillation. The distillate from the second distillation, comprising DIPH and beta-IPH, is thermally treated to isomerize the beta-IPH impurity to its higher boiling isomer, alpha-IPH, and then the effluent resulting from such treatment comprising DIPH and alpha-IPH is recycled back to the first distillation unit, which is so operated as to separate alpha-IPH from DIPH. Hence, both the alpha-IPH contained in the DIPH crude feed to the first distillation unit as well as the alpha-IPH contained in the effluent from the aforesaid thermal treatment is separated from DIPH in the first distillation unit.

The residue from the foregoing second distillation, being essentially free of beta-IPH and consisting essentially of relatively pure DIPH, can be further treated in a simple flash distillation unit to produce a distillate of high clarity and purity.

As can be seen, this alternative method of DIPH purification is quite unattractive since it requires further processing and additional equipment, compared to the simplified preferred methods previously discussed. Moreover, this alternative method, resulting in obtainment of DIPH as a relatively pure residue from the second distillation, only arrives at this result at the expense of considerable amounts of DIPH, contaminated with beta-IPH, passing as a distillate form said second distillation and requiring further treatment in order to recover the DIPH as a distillate of high purity.

In another alternative embodiment of this invention, especially applicable when the original DIPH crude feedstock to be purified is relatively highly pure to begin with or has a relatively low alpha-IPH content compared to that of beta-IPH, the crude DIPH feedstock can be first thermally treated in order to isomerize the beta-IPH present to its higher boiling isomer, alpha-IPH and then the effluent from this thermal treatment, consisting essentially of DIPH and alpha-IPH, can be distilled so as to separate DIPH as a distillate of high purity from the residue comprising alpha-IPH.

Accordingly, it can be seen that the present invention has provided simplified means for purification if DIPH, based essentially upon the controlled adjustment of the equilibrium of the alpha-IPH and beta-IPH impurities in the presence of DIPH and, perhaps, negligible amounts of other impurities, whereby essentially all of the beta-IPH is isomerized to alpha-IPH and DIPH is separated, as an overhead product of 99+% purity, from the resultant alpha-IPH. The present invention has also provided a number of alternative means for accomplishing the isomerization of beta-IPH to alpha-IPH. Thus, a first overhead distillation product containing DIPH and beta-IPH can, in the absence of alpha-IPH, be separated directly by means of a second distillation. However, it is preferable to preheat or "heat-soak" the first overhead product before this is distilled in a second distillation step, in order to effect the isomerization of beta-IPH to alpha-IPH, since this isomerization is more easily performed by the "heat-soak" than by any of the other alternative means for conducting this isomerization.

As noted, the preheat or heat-soak step for promoting isomerization of beta-IPH to alpha-IPH may be accelerated by the addition of an acidic or basic catalyst. Such catalyzed isomerization would have the advantage of proceeding at a faster rate, but can prevent a disadvantage of requiring an additional step in order to separate the catalyst from the product prior to final distillation, since the presence of the catalyst during final distillation would cause part of the alpha-IPH to isomerize back to beta-IPH.

All of the previously, simplified means for purification of DIPH, as hereinabove discussed, can be utilized with ordinary distillation equipment and conventional distillation techniques. However, in order to obtain above 99% purity of DIPH, it is recognized that the overhead product from the first distillation, containing essentially DIPH and beta-IPH, could be subsequentially distilled through a much more efficient column than is utilized in the first distillation of DIPH crude. However, distillation column for this second distillation would require at least 2 to 3 times as many theoretical plates as that required to separate alpha-IPH and DIPH. Such an efficient second column would enable beta-IPH to pass as overhead product and separate DIPH as a bottoms product, which must then be flash distilled in still another unit to yield the desired DIPH of greater than 99% purity. But as can be seen, this method of purification is quite costly and requires expensive equipment, and is accordingly inferior to the simplified methods for purification proposed by this invention.

In the most preferred embodiment of this invention, a 3-stage process to give the desired purity DIPH is contemplated, comprising two separate distillations and a thermal treatment interposed between these distillations.

In the first stage of this process, the crude DIPH feedstock is distilled in a reasonably efficient tower to remove the alpha-IPH, cis-trimethylcyclohexanol, and part of the transtrimethylcyclohexanol. Typical conditions for this distillation stage would involve operation of a 5- to 50-theoretical plate tower, preferably a 20-theoretical plate tower, operating without reflux or utilizing a 2/1 to 50/1 reflux ratio, preferably a 10/1 reflux ratio, whereby most of the DIPH and beta-IPH would be taken overhead, while most of the alpha-IPH and cis-trimethylcyclohexanol would remain as the bottoms product. The trans-trimethylcyclohexanol would partition between the overhead and bottoms. While some additional beta-IPH would be formed by isomerization of alpha-IPH to beta-IPH and that beta-IPH would be taken overhead, such isomerization could be minimized, if desired, by distilling at reduced pressure, although this would not be necessary.

The overhead product from this distillation would comprise about 96–98% DIPH and about 2–4% beta-IPH, while the recovered alpha-IPH, contained in the bottoms product, would constitute about 90%, and could be recycled back to a hydrogenator and hydrogenated under the desired conditions to form more DIPH crude.

In the second stage of this 3-stage process, the DIPH/beta-IPH overhead product from the first stage is thermally treated so as to isomerize beta-IPH to alpha-IPH from which DIPH may be readily separated by distillation. However, while the main purpose of this stage is to isomerize beta-IPH to alpha-IPH, trans-trimethylcyclohexanol that is present in the overhead product in the first distillation will also be isomerized to cis-trimethylcyclohexanol during the catalytic treatment of this stage since the ratio of these two alcohols at equilibrium is about 8:1 (cis:trans). Hence, this cis-alcohol impurity remains as a bottoms product, along with alpha-IPH during subsequent distillation of these materials with DIPH. Essentially, this second stage is primarily concerned with controlled adjustment of the equilibrium that exists between alpha-IPH and beta-IPH so as to favor formation of alpha-IPH. In order to obtain very low concentrations of beta-IPH in the effluent from the second stage thermal (or catalytic) treatment an important prerequisite for this stage is the prior removal of most of the alpha-IPH during the first stage; for, if this is not done, the concentration of beta-IPH remaining after the thermal treatment is much higher than if the alpha-IPH had been removed, as shown hereinbelow in Table 4 of Example 4.

Important variables for this thermal treatment are the residence time and the temperatures employed. While these can be obviously varied depending upon the starting feed composition and on the ultimate purity desired for the final product, the higher the temperature, up to a practical maximum of 300° C., the faster the isomerization, and the shorter the residence time required. For example, as shown in the examples, a four-hour residence time at 220° C. is sufficient to reduce the beta-IPH concentration from 3.6 wt. percent to 0.22 wt. percent, a 95% reduction, whereas four hours at 200° C. only reduced the beta-IPH concentration by 56%; thus, a longer residence time would be required at 200° C. to give lower beta-IPH concentrations. Higher or lower temperatures can also be used with a corresponding adjustment in the residence time, the general rule being that the higher the temperature the shorter the residence time. Practical considerations, however, would eliminate certain temperature conditions, such as temperatures of less than 100° C. and more than 300° C.

The thermal treatment of the second stage can be accelerated by addition of a catalyst, which permits the isomerization to occur at ambient conditions, although temperatures of from about 0° C. to about 300° C. may be employed. A variety of catalyst types can be used, exemplary of which are acidic catalysts such as sulfuric acid, acetic acid, polyphosphoric acid, acid clays such as bauxite or Georgia clay, acidic ion exchange resins such as Dowex 50 and Amberlite IR–100, etc.; basic catalysts such as aqueous caustic, basic clays such as Cliffchar, basic ion exchange resins such as Permutit S–1, etc.; and metal-supported catalysts including metals of Group VIII of the Periodic Table such as nickel, palladium, platinum, ruthenium, rhodium, etc., incorporated in a standard porous support such as alumina, silica-alumina, siliceous clays such as bentonite, montmorillonite, etc. (The Periodic Table referred to herein is that contained on page 628 of "Webster's Seventh New Collegiate Dictionary" published by G. & C. Merriam Company, Springfield, Mass., 1965.)

A more systematic and detailed list of acids and bases which would be of utility in the present invention includes: (1) inorganic acids generally such as $H_2SO_4$, $H_2S_2O_7$, $KHSO_4$, $H_3PO_4$, HCl, HBr, HI, HF, $H_3BO_3$, $H_2CO_3$, $H_2S$, $H_2SO_3$, $HNO_3$, $H_3PO_3$, $H_2SeO_3$, $H_4SiO_4$, $H_2SnO_3$, $H_2TeO_4$, $H_2S_2O_3$, $H_3AsO_4$, $H_3AsO_3$, $H_2B_4O_7$, $HClO_2$, $H_3PO_2$, $H_2Se$, $H_2SiO_3$, $H_2Te$, $H_2TeO_3$, $H_4P_2O_7$, $Al_2O_3$; (2) Lewis acids such as $BF_3$, $AlCl_3$, $AlI_3$, $ZnCl_2$, $SnCl_4$, $AlBr_3$, $AlF_3$, $SbBr_3$, $SbCl_3$, $SbCl_5$, $SbF_3$, $SbF_5$, $HgCl_2$, $TiCl_4$, $FeCl_3$, $ZrCl_4$, $FeBr_3$, $ZnBr_2$, $TiBr_4$, $MoBr_4$, $HgBr_2$, $BiCl_3$, $TeCl_2$, $TeCl_4$, $GaBr_3$, $GaCl_3$ $ZrCl_4$; (3) organic acids such as HCOOH; $CH_3COOH$;

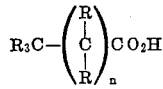

where R is a hydrogen atom, an alkyl group, a cycloalkyl group, an aralkyl group, or an aryl group, where $n$ is from 0 to 25; $XCH_2CO_2H$, $X_2CHCO_2H$, $X_3CCO_2H$, where X=F, Cl, Br, I, OH, $NO_2$, or RO, etc; other substituted organic acids such as

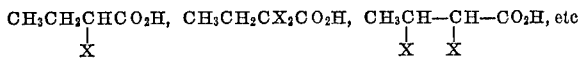

unsaturated acids such as

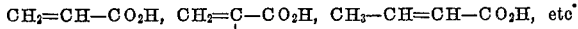

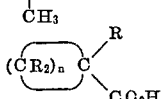

where $n$ is from 2 to 25 and R is a hydrogen atom, an alkyl group, a cycloalkyl group, an aralkyl group, or an aryl group;

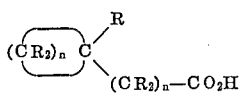

where $n$ is from 2 to 25 and R is a hydrogen atom, an alkyl group, a cycloalkyl group, an aralkyl group or an aryl group, etc.;

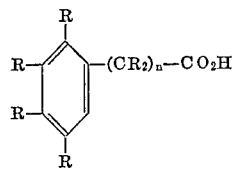

where $n$ is from 0 to 25 and R is a hydrogen atom, an alkyl group, an aralkyl group, a cycloalkyl group, an aryl group, halogen, $NO_2$, —OH, etc.; dicarboxylic acids such as glutaric acid, adipic acid, phthalic acid, etc.; tricarboxylic acids such as citric acid, etc.; and miscellaneous acidic materials such as phenol, cresol, etc.; and (4) bases including inorganic bases of NaOH, KOH, LiOH, $Al(OH)_3$, $Ca(OH)_2$, $Co(OH)_2$, $Cu(OH)_2$, $Cd(OH)_2$, $Fe(OH)_2$, $Fe(OH)_3$, $Mg(OH)_2$, $Mn(OH)_2$, $Ni(OH)_2$, $Ba(OH)_2$, BaO, CaO, CdO, CsOH, CuO, PbO, $PbO_2$, $Pb(OH)_2$, MgO, $MgCO_3$, $CaCO_3$, $Na_2CO_3$, $NaHCO_3$, $K_2CO_3$, $KHCO_3$, $Li_2CO_3$, $BaCO_3$, $Sr(OH)_2$, NiO, SiO, $SiCO_3$, $Ti_2O_3$, TiO; and organic bases such as tertiary amines of the formula $R_3N$ where R is an alkyl, cycloalkyl, aralkyl, or an aryl group, etc., examples of which are $(CH_3)_3N$, $(C_2H_5)_3N$, $CH_3N(C_2H_5)_2$, $(C_3H_7)_3N$, $(C_6H_5)_3N$ etc.; compounds having the formula

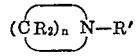

where $n$ is from 2 to 20 and R is a hydrogen atom, an alkyl, cycloalkyl, aralkyl, or aryl group and R' is an alkyl, cycloalkyl, aralkyl, or aryl group; and miscellaneous organic bases such as pyridine, indole, quinoline, and alcoholates of metals of Groups I–A and II–A.

However, while the catalyst promotes a faster rate of isomerization, it also necessitates an extra step for its removal from the product. In order to facilitate catalyst removal, a solid catalyst may be used. For example, a slurry-type operation can be used, followed by filtration to remove the catalyst. Alternatively, the catalyst can be used in a fixed bed operation.

In the third stage of this preferred process, the product from the thermal treatment of the second stage is distilled in order to separate the DIPH from the newly-formed alpha-IPH.

While the conditions of this distillation are not critical, it is nevertheless necessary to operate this distillation in such a manner as to preclude beta-IPH from building-up again. Since the separation of DIPH from alpha-IPH in the third stage of the present invention is not very difficult by means of distillation, this necessitates a distillation tower of fewer plates and lower reflux ratios than used in the distillation of the first stage. A typical set of conditions that might be used in this distillation would involve a 5- to 50-theoretical plate tower, preferably a 20-theoretical plate tower, operated without reflux or with reflux at a reflux ratio of from 2/1 to 50/1, preferably a 5/1 reflux ratio. Preferably, although not necessarily, this distillation can be carried out at reduced pressure in order to reduce isomerization of alpha-IPH to beta-IPH. Pressures on the order of 50–100 millimeters of mercury are sufficient to reduce this isomerization; of course, even lower pressures can be used to further inhibit this isomerization.

The process of this invention in all its stages may be carried out by conventional means in any suitable equipment. Flow diagrams of the most preferred embodiments of the present purification process can be seen by reference to the accompanying drawings, which illustrate these embodiments schematically.

FIGURE 1 illustrates the preferred method for producing high purity DIPH of greater than 99% purity. In the method shown in this figure, the DIPH and beta-IPH overhead product (typical composition shown) resulting from the distillation of a typical DIPH crude feedstock (typical composition shown) is subjected to a thermal treatment in order to accommodate isomerization of beta-IPH to alpha-IPH. The resulting DIPH and alpha-IPH mixture (typical composition shown) resulting from this treatment is then distilled in a second tower, wherein DIPH of better than 99% purity is obtained as overhead product and separated from the alpha-IPH component, which component may then be recovered and used as feedstock for the preparation for further hydrogenation to DIPH.

Figure 2:
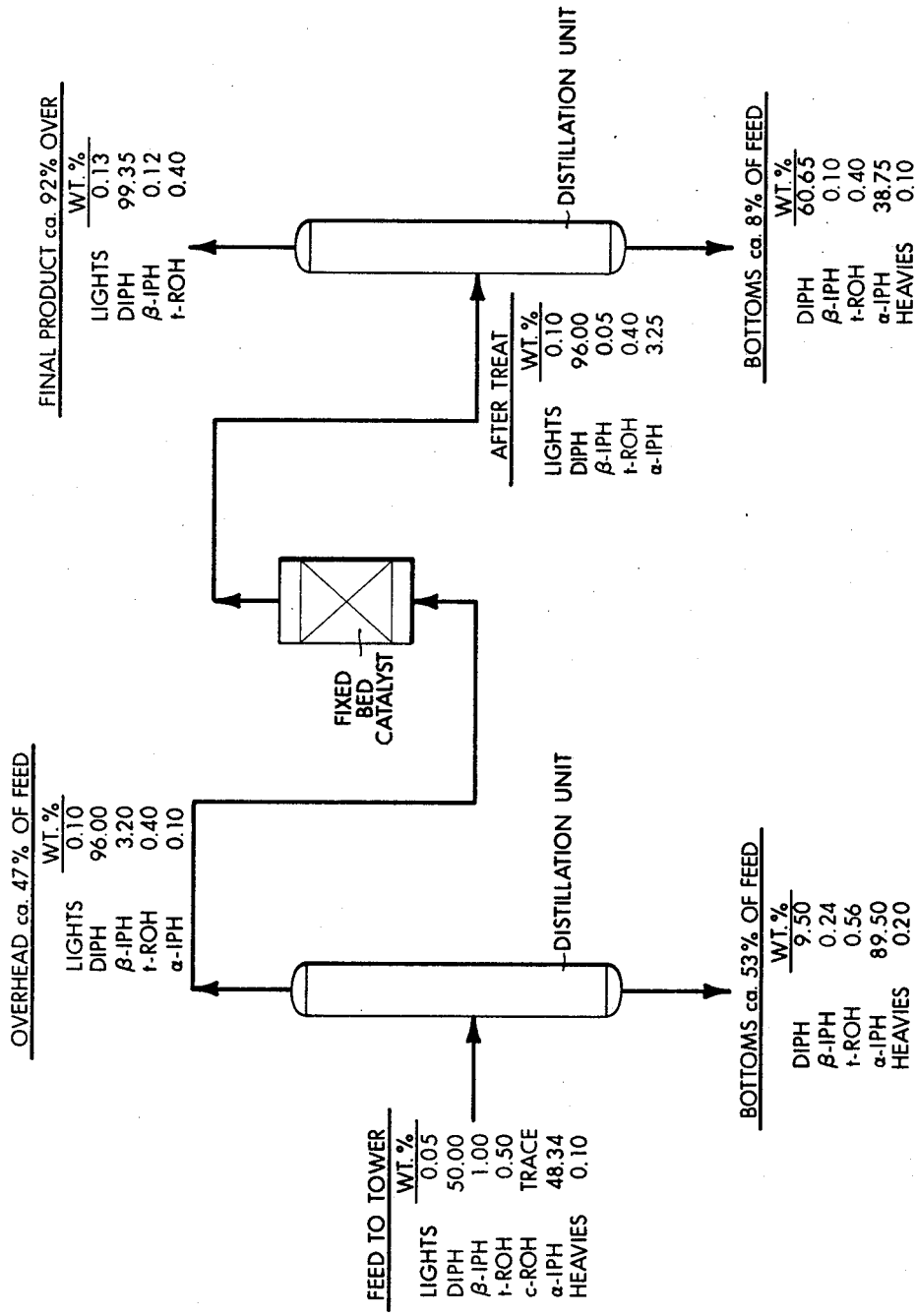

FIGURE 2 illustrates an alternative embodiment to that shown in FIGURE 1 for the isomerization of beta-IPH to alpha-IPH utilizing acidic or basic catalysts. In this figure, the thermal treatment is replaced by its alternate: a catalytic treatment utilizing a catalyst bed of an appropriate acid or base catalyst.

The DIPH feedstock that may be utilized in this invention may consist of DIPH, in the concentration of 20–99.9 wt. percent, beta-IPH in the concentration of 0.01–70 wt. percent, alpha-IPH in the concentration of 1–80 wt. percent, cis-3,3,5-trimethylcyclohexanol in the concentration of 0.01–10 wt. percent, and trans-3,3,5-trimethylcyclohexanol in the concentration of 0.01–10 wt. percent. However, other DIPH feedstocks containing both lighter and heavier boilers than DIPH are contemplated within the scope of this invention, the lighter boilers being present in an amount of about 0.01 to about 0.5 wt. percent and the heavier boilers, including materials such as $C_{12}$ ketones, being present in an amount of 0.05 to about 40 wt. percent.

The invention is further illustrated in great detail by the following examples, but it is to be understood that the present invention in its broadest aspects is not necessarily limited to the specific temperatures, residence times, catalysts, and other conditions set forth therein.

EXAMPLE 1

In this example, DIPH, produced by the hydrogenation of alpha-isophorone and containing: unreacted alpha-IPH, beta-IPH, and the products of overhydrogenation, cis- and trans-3,3,5-trimethylcyclohexanol (abbreviated hereinafter in the tables as "c-ROH" and "t-ROH"), was purified by means of continuous distillation under varying conditions and with different feed compositions. The results and conditions of purification are shown in Table 1.

conducted with varying feeds and at various conversion levels. The results of these runs are shown in Table 2.

TABLE 2.—HYDROGENATION OF A FEEDSTOCK OF RELATIVELY HIGH β-IPH CONCENTRATION

| Run No. | | Composition, wt. percent | | | | | |
|---|---|---|---|---|---|---|---|
| | | α-IPH | β-IPH | DIPH | t-ROH | c-ROH | Other |
| 1 | Feed | 89.9 | 6.8 | | | | 3.3 |
| | Product at various conversion of alpha-IPH levels. | 35.0 | 6.5 | 55.3 | .31 | .06 | 2.8 |
| | | 25.0 | 5.7 | 65.7 | .33 | .15 | 3.1 |
| | | 14.3 | 5.4 | 76.2 | .54 | .26 | 3.3 |
| | | 4.7 | 5.4 | 85.3 | .94 | .52 | 3.1 |
| 2 | Feed | 95.0 | 1.7 | | | | 3.3 |
| | Product at various conversion of alpha-IPH levels. | 31.6 | 1.5 | 63.1 | .37 | .17 | 3.3 |
| | | 4.9 | 1.2 | 88.1 | 1.59 | .72 | 3.5 |

Table 2 shows that if the alpha-isophorone feed contains a high concentration of beta-isophorone, then the crude DIPH reaction product is also high in beta-isophorone. This occurs because beta-isophorone is only slightly hydrogenated to dihydroisophorone in the presence of alpha-isophorone, since the alpha-isophorone is much more strongly absorbed on the catalyst. The net result is that most of the beta-isophorone, which is present in the feed, remains in the crude dihydroisophorone reaction product, thus complicating the distillation requirements.

Table 3 below shows that the impurity level also depends on the conversion in the hydrogenation reaction. At low conversions, there is little alcohol formation, but as conversion increases, so does alcohol formation. However, the level of beta-isophorone remains relatively constant regardless of conversion. However, as conversion increases, the amount of dihydroisophorone also increases, and the ratio of beta-IPH/DIPH decreases; this, in effect, lowers the beta-IPH concentration. Thus, the overall net effect can be described as follows: high conversion gives

TABLE 1.—PURIFICATION OF CRUDE DIPH BY CONTINUOUS DISTILLATION

| | Conditions | | | Compositions, wt. percent | | | | | |
|---|---|---|---|---|---|---|---|---|---|
| Run No. | Number Actual Plates | Reflux Ratio | Percent Overhead | | DIPH | α-IPH | β-IPH | t-ROH | c-ROH | Other |
| 1 | 60 | 30/1 | 20 | Feed | 68.7 | 20.0 | .46 | 2.0 | 8.0 | .84 |
| | | | | Overhead | 94.8 | | .93 | .52 | .05 | 3.7 |
| | | | | Bottoms | 60.4 | 26.7 | .18 | 2.2 | 9.9 | .62 |
| 2 | 60 | 12/1 | 19 | Feed | 68.7 | 20.0 | .46 | 2.0 | 8.0 | .84 |
| | | | | Overhead | 92.9 | .10 | .90 | .87 | .10 | 5.0 |
| | | | | Bottoms | 62.8 | 25.1 | .28 | 2.1 | 9.5 | .22 |
| 3 | 60 | 30/1 | 21 | Feed | 79.0 | 7.2 | .32 | 2.4 | 10.2 | .88 |
| | | | | Overhead | 94.8 | .04 | .52 | .63 | .04 | 4.0 |
| | | | | Bottoms | 74.4 | 9.5 | .19 | 2.9 | 12.9 | .11 |
| 4 | 60 | 12/1 | 21 | Feed | 79.0 | 7.2 | .32 | 2.4 | 10.2 | .88 |
| | | | | Overhead | 94.8 | | .53 | 1.0 | .10 | 3.6 |
| | | | | Bottoms | 75.6 | 9.0 | .15 | 2.7 | 12.4 | .15 |
| 5 | 40 | 35/1 | 55 | Feed | 60.1 | 39.3 | .21 | .12 | tr. | .27 |
| | | | | Overhead | 96.5 | .15 | 3.1 | .11 | | .14 |
| | | | | Bottoms | 15.4 | 83.6 | .38 | .08 | .05 | .49 |
| 6 | 40 | 30/1 | 56 | Feed | 56.1 | 34.2 | 6.5 | .36 | .32 | 2.5 |
| | | | | Overhead | 88.1 | .80 | 9.0 | .28 | .04 | 1.8 |
| | | | | Bottoms | 14.9 | 82.2 | .36 | .16 | .27 | 2.2 |

As may be noted, Run #1 illustrates build-up of beta-IPH in the overhead product and also shows that trans-3,3,5-trimethylcyclohexanol partitions between the overhead product and the bottoms product.

Run #2 shows that a lower reflux ratio gives more trans-alcohol than does Run #1.

Runs #3 and #4 show that a DIPH crude feedstock containing a lower alpha-IPH concentration results in less beta-IPH in the overhead product.

Run #5 illustrates a large buildup of beta-IPH in both the overhead and bottoms product.

EXAMPLE 2

This example shows that the levels of impurities in the DIPH crude feedstock may vary considerably and also indicates that the impurity levels depend upon the conversion in the hydrogenation reaction.

In this example, two separate hydrogenation runs were low beta-IPH but high alcohol formation; low conversion gives low alcohol formation but high beta-IPH concentration.

TABLE 3.—EFFECT OF CONVERSION LEVEL ON IMPURITY CONCENTRATION

| Conversion, percent | DIPH | Alpha-IPH | Beta-IPH | t-ROH | c-ROH | Other |
|---|---|---|---|---|---|---|
| 0 | 0 | 99.3 | .34 | 0 | 0 | .27 |
| 6.8 | 7.0 | 92.5 | .36 | | | .17 |
| 13.5 | 13.6 | 85.8 | .30 | | | .24 |
| 33.9 | 33.7 | 65.4 | .39 | .14 | .11 | .30 |
| 55.3 | 54.5 | 44.2 | .38 | .45 | .24 | .30 |
| 65.6 | 64.4 | 33.8 | .40 | .62 | .38 | .42 |
| 76.3 | 74.6 | 23.2 | .39 | .86 | .60 | .37 |
| 88.6 | 85.6 | 11.1 | .32 | 1.15 | 1.47 | .31 |
| 97.0 | 92.2 | 2.7 | .27 | 1.70 | 2.61 | .51 |
| 99.5 | 90.4 | .3 | .25 | 2.81 | 5.71 | .49 |

EXAMPLE 3

This example illustrates the preferred three-stage process of this invention. In this example, a crude DIPH feed was run through a 20-theoretical plate column at 20/1 reflux ratio under atmospheric conditions to yield the following products:

Overhead product—about 72% of feed
Bottoms product—about 28% of feed

|  | Composition, wt. percent | | | | | | |
| --- | --- | --- | --- | --- | --- | --- | --- |
|  | Lights | DIPH | Beta-IPH | t-ROH | c-ROH | Alpha-IPH | Misc. | Heavies |
| Feed | .13 | 76.7 | 1.41 | 1.25 | .41 | 19.90 | .04 | .16 |
| Overhead | .20 | 96.3 | 2.47 | .86 | .10 | 0.05 | | |
| Bottoms | | 27.5 | 0.36 | 2.18 | 1.22 | 68.00 | 0.14 | 0.70 |

The overhead stream was conveyed to an ordinary, closed reactor vessel and heat treated in the second or "heat soak" stage of this process.

In this second stage, the overhead product from the first or distillation stage was refluxed overnight at 190–192° C. Analysis of the streams was as follows:

|  | Composition, wt. percent | | | | | | |
| --- | --- | --- | --- | --- | --- | --- | --- |
|  | Lights | DIPH | Beta-IPH | t-ROH | c-ROH | Alpha-IPH | Heavies |
| Before "heat soak" | .20 | 96.30 | 2.47 | .86 | .10 | .05 | |
| After "heat soak" | .20 | 96.30 | .03 | .86 | .10 | 2.49 | .03 |

The product resulting from the second or "heat soak" stage was then distilled in a third or final distillation stage.

The final distillation was performed on a 20-theoretical tray tower to yield a 99.8% pure DIPH product. The conditions under which this final distillation was conducted are set forth herebelow:

Pressures at condenser, mm. Hg _____ 50
Pressure of bottoms, mm. Hg _____ 70
Reflux ratio _____ 5:1
Percent of feed as overhead product ____ca__ 84
Percent of feed as bottoms ____ca__ 16

| Stream Analysis | Composition, wt. percent | | | | | | |
| --- | --- | --- | --- | --- | --- | --- | --- |
|  | Lights | DIPH | Beta-IPH | t-ROH | c-ROH | Alpha-IPH | Heavies |
| Feed | 0.20 | 96.3 | 0.03 | 0.86 | 0.10 | 2.49 | .03 |
| Overhead | 0.17 | 99.77 | 0.06 | trace | trace | | |
| Bottoms | | 78.1 | | 5.48 | 0.91 | 15.4 | 0.06 |

EXAMPLE 4

This example illustrates that the thermal or heat-soak treatment to isomerize beta-IPH to alpha-IPH is dependent both on the alpha-IPH level as well as on the temperatures employed. Each of these variables and their effects are shown in Tables 4 and 5.

TABLE 4.—"HEAT-SOAK" TO ISOMERIZE BETA-IPH DEPENDS ON IPH LEVEL

| Sample | Feed Composition, wt. percent | | | Product Composition After Equilibration at 200° C., wt. percent | | |
| --- | --- | --- | --- | --- | --- | --- |
|  | DIPH | Alpha-IPH | Beta-IPH | DIPH | Alpha-IPH | Beta-IPH |
| Crude DIPH | 60 | 37 | 3 | 60 | 39.4 | .6 |
| Crude DIPH after removal of most of the IPH | 96 | 1 | 3 | 96 | 3.94 | .06 |

TABLE 5.—"HEAT-SOAK" RESIDENCE TIME IS DEPENDENT ON TEMPERATURE

| Run No. | Conditions | | | Composition, wt. percent | | | | Beta-IPH Reduction, percent |
| --- | --- | --- | --- | --- | --- | --- | --- | --- |
|  | Temp., ° C. | Time, hrs. |  | DIPH | Beta-IPH | Alpha-IPH | Others |  |
| 1 | 220 | 4 | Feed | 94.6 | 3.6 | 1.3 | .5 |  |
|  |  |  | Product | 94.8 | .22 | 4.6 | .4 | 95 |
| 2 | 200 | 4 | Feed | 95.0 | 3.7 | 0.8 |  |  |
|  |  |  | Product | 94.8 | 1.7 | 2.9 |  | 56 |

EXAMPLE 5

This example is identical to the preferred three-stage process shown in Example 3, except for the fact that the second stage has been accelerated by utilizing a variety of catalysts.

The types of catalysts used, the conditions employed and results of isomerization are shown in Table 6 below.

TABLE 6.—CATALYZED ISOMERIZATION OF BETA-IPH TO ALPHA-IPH

| Run No. | Type | Wt. percent | Temp. °C. | Time, min. | Percent Beta-IPH |
|---|---|---|---|---|---|
| 1 | Polyphosphoric Acid | 5 | 150 | 0 | 5.3 |
|   |   |   | 150 | 4 | 3.9 |
|   |   |   | 150 | 8 | 2.1 |
|   |   |   | 150 | 12 | 1.2 |
|   |   |   | 150 | 18 | 1.0 |
|   |   |   | 150 | 24 | 0.9 |
| 2 | do | 25 | 150 | 0 | 5.2 |
|   |   |   |   | 15 | 0.9 |
|   |   |   |   | 0 | 94.8 |
| 3 | do | 50 | 175-197 | 7 | 55.4 |
|   |   |   |   | 14 | 1.6 |
|   |   |   |   | 18 | 1.5 |
| 4 | Alumina (acid washed) | 25 | 150 | 0 | 5.3 |
|   |   |   |   | 15 | 0.6 |
|   |   |   |   | 0 | 2.4 |
| 5 | do | 25 | 100 | 20 | 0.9 |
|   |   |   |   | 50 | 0.8 |
|   |   |   |   | 0 | 4.9 |
| 6 | Permutit-S-1 (basic ion-exchange resin). | 5 | 150 | 23 | 3.3 |
|   |   |   |   | 79 | 2.2 |
|   |   |   |   | 289 | 1.2 |
|   |   |   |   | 0 | 5.2 |
|   |   |   |   | 19 | 2.8 |
| 7 | Nickel on kieselguhr | 25 | 150 | 34 | 2.1 |
|   |   |   |   | 69 | 1.4 |
|   |   |   |   | 89 | 1.2 |
|   |   |   |   | 159 | 1.0 |

It will be understood that the above description is merely illustrative of preferred embodiments and specific examples of the present invention, of which variations may be made by those skilled in the art without departing from the spirit and purview thereof.

What is claimed is:

1. A method for the purification of dihydroisophorone, comprising distilling a crude dihydroisophorone feedstock comprising dihydroisophorone, alpha-isophorone and beta-isophorone in a first zone to separate the distillate comprising dihydroisophorone and beta-isophorone from the residue comprising alpha-isophorone; withdrawing said distillate from said zone and passing said distillate into a second zone, heating said distillate in said second zone at a temperature sufficient to isomerize beta-isophorone substantially completely to alpha-isophorone without causing pyrolysis of the remainder of said distillate; passing the effluent from said second zone into a third zone, distilling said effluent in said third zone to separate the distillate comprising dihydroisophorone from the residue comprising alpha-isophorone, and recovering the purified dihydroisophorone product.

2. A method according to claim 1 wherein the distillate in said second zone is heated to a temperature between about 100° C. and about 300° C.

3. A method according to claim 1 comprising removing said residue comprising alpha-isophorone from said first zone as said distillate is withdrawn therefrom.

4. A method according to claim 1 comprising removing the thus-formed alpha-isophorone from said third zone as the dihydroisophorone component of said distillate comprising dihydroisophorone is removed therefrom.

5. A method for the purification of dihydroisophorone comprising distilling a crude dihydroisophorone reaction product containing dihydroisophorone and (A) a lower boiling component boiling below component (B) infra and selected from the group consisting of beta-isophorone, trans-3,3,5-trimethylcyclohexanol, and mixtures thereof and (B) a higher boiling component selected from the group consisting of alpha-isophorone, cis-3,3,5-trimethylcyclohexanol and mixtures thereof in a first zone to separate the distillate containing compounds selected from the group consisting of dihydroisophorone, beta-isophorone, and trans - 3,3,5 - trimethylcyclohexanol, from the residue containing compounds selected from the group consisting of alpha-isophorone and cis-3,3,5-trimethylcyclohexanol; withdrawing the distillate from said zone and passing same into a second zone, heating said distillate in said second zone at a temperature sufficient to isomerize beta-isophorone substantially completely to alpha-isophorone without causing pyrolysis of the remainder of said distillate; passing the effluent from said second zone into a third zone, distilling said effluent in said third zone to separate the distillate comprising dihydroisophorone from the residue, and recovering the purified dihydroisophorone product.

6. A method according to claim 5 wherein the mixture in said second zone is heated to a temperature of between about 100° C. and about 300° C.

7. A method according to claim 5 comprising removing said residue comprising alpha-isophorone from said first zone as said distillate is withdrawn therefrom.

8. A method according to claim 5 comprising removing the thus-formed alpha-isophorone from said third zone as the dihydroisophorone components of said distillate comprising dihydroisophorone is removed therefrom.

9. A method for the purification of dihydroisophorone, comprising distilling a crude dihydroisophorone feedstock comprising dihydroisophorone, alpha - isophorone and beta-isophorone in a first zone to separate the distillate comprising dihydroisophorone and beta-isophorone from the residue comprising alpha-isophorone; withdrawing the distillate comprising said dihydroisophorone and beta-isophorone from said zone and passing said distillate into a second zone, heating said distillate in said second zone under conditions of total reflux for a time sufficient to isomerize beta - isophorone substantially completely to alpha-isophorone without causing pyrolysis of the remainder of said distillate and then distilling the alpha-isophorone-enriched mixture to separate the distillate comprising dihydroisophorone from the residue comprising alpha-isophorone, and recovering the purified dihydroisophorone product.

10. A method according to claim 9 comprising removing said residue comprising alpha-isophorone from said first zone as said distillate is withdrawn therefrom.

11. A method according to claim 9 comprising removing the thus-formed alpha-isophorone from said second zone as the dihydroisophorone component of said distillate comprising dihydroisophorone is removed therefrom.

12. A method for the purification of dihydroisophorone comprising distilling a crude dihydroisophorone reaction product containing dihydroisophorone and (A) a lower boiling component boiling below component (B) infra and selected from the group consisting of beta-isophorone, trans-3,3,5-trimethylcyclohexanol, and mixtures thereof and (B) a higher boiling component selected from the group consisting of alpha-isophorone, cis-3,3,5-trimethylcyclohexanol, and mixtures thereof in a first zone to separate the distillate comprising dihydroisophorone and compounds selected from the group consisting of beta-isophorone, and beta-isophorone and trans-3,3,5-trimethylcyclohexanol, from the residue comprising compounds selected from the group consisting of alpha-isophorone and cis-3,3,5-trimethylcyclohexanol and alpha-isophorone; withdrawing the distillate from said zone and passing same into a second zone, heating said distillate under conditions of total reflux for a time sufficient to isomerize beta-isophorone substantially completely to alpha-isophorone without causing pyrolysis of the remainder of said distillate; and then distilling the alpha-isophorone-enriched distillate to separate a distillate comprising dihydroisophorone from the residue comprising alpha-isophorone, and recovering the purified dihydroisophorone product.

13. A method according to claim 12 comprising removing said residue comprising alpha-isophorone from said first zone as said distillate is withdrawn therefrom.

14. A method according to claim 12 comprising removing the thus-formed alpha-isophorone from said second zone as the dihydroisophorone component of said distillate from said second zone is removed therefrom.

15. A method for the purification of dihydroisophorone comprising distilling a crude dihydroisophorone feedstock comprising dihydroisophorone, alpha - isophorone and beta-isophorone in a first zone to separate the distillate comprising dihydroisophorone and beta-isophorone from the residue comprising alpha - isophorone; withdrawing said distillate comprising said dihydroisophorone and beta-isophorone from said zone and passing said distillate into a second zone, contacting said distillate in said second zone at a temperature of between about 0° C. and about 300° C. with a catalyst selected from the group consisting of acidic catalysts, basic catalysts, and catalyst composites comprising at least one Group VIII metal incorporated in a porous support to isomerize beta-isophorone substantially completely to alpha-isophorone without causing pyrolysis of the remainder of said distillate; passing the alpha-isophorone-enriched effluent from said second zone into a third zone, distilling said effluent in said third zone to separate a distillate comprising dihydroisophorone from the residue comprising alpha-isophorone, and recovering the purified dihydroisophorone product.

16. A method according to claim 15 comprising removing the residue comprising alpha-isophorone from said first zone as said distillate from said first zone is withdrawn therefrom.

17. A method according to claim 15 comprising removing the alpha-isophorone from said third zone as the dihydroisophorone component of said distillate from said third zone is removed therefrom.

18. A method according to claim 15 wherein said acidic catalyst is selected from the group consisting of inorganic acids, organic acids, acid clays, and acidic ion-exchange resins.

19. A method according to claim 15 wherein said basic catalyst is selected from the group consisting of hydroxides of metals of Groups I–A and II–A, alcoholates of metals of Groups I–A and II–A, basic clays, and basic ion-exchange resins.

20. A method for the purification of dihydroisophorone comprising distilling a crude dihydroisophorone reaction product containing dihydroisophorone and (A) a lower-boiling component boiling below component (B) infra and selected from the group consisting of beta-isophorone, trans-3,3,5-trimethylcyclohexanol and mixtures thereof and (B) a higher boiling component selected from the group consisting of alpha-isophorone, cis-3,3,5-trimethyl-cyclohexanol, and mixtures thereof in a first zone to separate the distillate comprising dihydroisophorone and compounds selected from the group consisting of beta-isophorone, and beta-isophorone and trans-3,3,5-trimethyl-cyclohexanol from the residue comprising compounds selected from the group consisting of alpha-isophorone and cis-3,3,5-trimethylcyclohexanol and alpha-isophorone; withdrawing the distillate from said zone and passing some into a second zone, contacting said distillate in said second zone at a temperature of between about 0° C. and about 300° C. with a catalyst selected from the group consisting of acidic catalysts, basic catalysts, and catalyst composites comprising at least one Group VIII metal incorporated in a porous support to isomerize beta-isophorone substantially completely to alpha-isophorone without causing pyrolysis of the distillate; passing the effluent from said second zone into a third zone, distilling said effluent in said third zone to separate the distillate comprising dihydroisophorone from the residue comprising alpha-isophorone, and recovering the purified dihydroisophorone product.

21. A method according to claim 20 comprising removing said residue comprising alpha-isophorone from said first zone as said distillate is withdrawn therefrom.

22. A method according to claim 20 comprising removing the alpha-isophorone from said third zone as the dihydroisophorone component of said distillate from said third zone is removed therefrom.

23. A method according to claim 20 wherein said acidic catalyst is selected from the group consisting of inorganic acids, organic acids, acid clays, acidic ion-exchange resins, and said basic catalyst is selected from the group consisting of hydroxides of metals of Groups I–A and II–A, alcoholates of metals of Groups I–A and II–A, basic clays, and basic ion-exchange resins.

24. A method for the purification of dihydroisophorone, comprising heating a crude dihydroisophorone feedstock comprising dihydroisophorone, alpha-isophorone, and beta-isophorone in a first zone at a temperature sufficient to isomerize beta-isophorone substantially completely to alpha-isophorone without causing pyrolysis of the remainder of said feedstock; passing the effluent from said zone into a second zone, distilling said effluent in said second zone to separate the distillate comprising dihydroisophorone from the residue comprising alpha-isophorone, and recovering the purified dihydroisophorone product.

25. A method according to claim 24 wherein the feedstock in said first zone is heated to a temperature of between about 100° C. and about 300° C.

26. A method according to claim 24 comprising removing said residue comprising alpha-isophorone from said first zone as said effluent is withdrawn therefrom.

27. A method according to claim 24 comprising removing the thus-formed alpha-isophorone from said second zone as the dihydroisophorone component of said distillate is removed therefrom.

28. A method according to claim 24 comprising conducting said heating step in the presence of a catalyst selected from the group consisting of acidic catalysts, basic catalysts, and catalyst composites comprising at least one metal of Group VIII incorporated in a porous support selected from the group consisting of siliceous clays and acid treated clays.

29. A method according to claim 28 wherein said acidic catalyst is selected from the group consisting of inorganic acids, organic acids, acid clays, acidic ion-exchange resins and said basic catalyst is selected from the group consisting of hydroxides of the metals of Groups I–A and II–A, alcoholates of metals of Groups I–A and II–A, basic clays and basic ion-exchange resins.

30. A method for the purification of dihydroisophorone, comprising distilling a crude dihydroisophorone feedback comprising dihydroisophorone, alpha-isophorone and beta-isophorone in a first zone to separate the distillate comprising dihydroisophorone and beta-isophorone from the residue comprising alpha-isophorone; withdrawing the distillate from said zone and continuously passing said distillate into a second zone and distilling said distillate under conditions such that the beta-isophorone is substantially completely isomerized to alpha-isophorone in said second zone without causing pyrolysis of the remainder of said distillate while concurrently separating the distillate comprising dihydroisophorone from the residue comprising alpha-isophorone, and recovering the purified dihydroisophorone product.

31. A method for the purification of dihydroisophorone, comprising distilling a crude dihydroisophorone feedstock comprising dihydroisophorone, alpha-isophorone, and beta-isophorone in a first zone to separate a distillate comprising dihydroisophorone and beta-isophorone from the residue comprising alpha-isophorone; withdrawing said distillate from said zone and passing said distillate into a second zone, distilling said distillate in said second zone to separate the distillate comprising beta-isophorone and dihydroisophorone from the residue comprising dihydroisophorone; withdrawing said distillate from the second zone and passing said distillate into a third zone, heating said distillate in said third zone at a temperature sufficient to isomerize beta-isophorone substantially completely to alpha-isophorone without causing pyrolysis of the remainder of said distillate; recycling said effluent from said third zone back into said first zone; withdrawing said residue from said second zone and passing said residue into a fourth zone, distilling said residue in said fourth zone to separate the distillate comprising dihydroisophorone from the residue comprising heavier products, and recovering the purified dihydroisophorone product.

References Cited

UNITED STATES PATENTS

| | | | |
|---|---|---|---|
| 2,560,361 | 7/1951 | Morrell et al. | 260—586 |
| 2,692,289 | 10/1954 | Nelson | 260—586 |
| 2,971,036 | 2/1961 | James | 203—29 |
| 3,337,423 | 8/1967 | Schmitt et al. | 203—37 |
| 3,337,632 | 8/1967 | Schmitt et al. | 260—586 |
| 3,337,633 | 8/1967 | Schmitt et al. | 203—91 |

WILBUR L. BASCOMB, JR., *Primary Examiner.*